(12) United States Patent
Breiner et al.

(10) Patent No.: US 8,222,338 B2
(45) Date of Patent: Jul. 17, 2012

(54) AQUEOUS DISPERSIONS INCLUDING AT LEAST ONE ALKYD RESIN AND AT LEAST ONE ADDITION POLYMER HAVING AT LEAST ONE (METH)ACRYLAT-SEGMENT

(75) Inventors: Christine Breiner, Laudenbach (DE); Joachim Knebel, Alsbach-Haehnlein (DE); Gerold Schmitt, Aschaffenburg (DE)

(73) Assignee: Evonik Röhm GmbH, Darmstadt (DE)

( * ) Notice: Subject to any disclaimer, the term of this patent is extended or adjusted under 35 U.S.C. 154(b) by 289 days.

(21) Appl. No.: 12/678,597

(22) PCT Filed: Oct. 6, 2008

(86) PCT No.: PCT/EP2008/063362
§ 371 (c)(1),
(2), (4) Date: Mar. 17, 2010

(87) PCT Pub. No.: WO2009/047237
PCT Pub. Date: Apr. 16, 2009

(65) Prior Publication Data
US 2010/0197851 A1    Aug. 5, 2010

(30) Foreign Application Priority Data
Oct. 8, 2007   (DE) .......................... 10 2007 048 189

(51) Int. Cl.
*C08L 75/04*  (2006.01)
*C08L 33/10*  (2006.01)
*C08F 118/02*  (2006.01)

(52) U.S. Cl. .................... 524/507; 524/502; 526/319

(58) Field of Classification Search .................. 524/507, 524/502; 526/319
See application file for complete search history.

(56) References Cited

U.S. PATENT DOCUMENTS

| 5,322,865 | A |   | 6/1994 | Inoue et al. |
| 5,538,760 | A |   | 7/1996 | Sharma |
| 5,721,294 | A | * | 2/1998 | Buter et al. .................... 523/201 |

FOREIGN PATENT DOCUMENTS

| DE | 33 39 212 |    | 6/1984 |
| DE | 3339212 A1 | * | 6/1984 |
| EP | 0 554 780 |    | 8/1993 |
| WO | 2007 042684 |   | 4/2007 |

OTHER PUBLICATIONS

U.S. Appl. No. 12/990,164, filed Oct. 28, 2010, Schuetz, et al.
U.S. Appl. No. 12/678,160, Mar. 15, 2010, Breiner, et al.

* cited by examiner

*Primary Examiner* — Michael M Bernshteyn
(74) *Attorney, Agent, or Firm* — Oblon, Spivak, McClelland, Maier & Neustadt, L.L.P.

(57) ABSTRACT

The present invention relates to an aqueous dispersion comprising at least one alkyd resin and at least one addition polymer having at least one (meth)acrylate segment which comprises 1% to 30% by weight of units derived from (meth)acrylates which in the alkyl radical have at least one double bond and 8 to 40 carbon atoms, 0.1% to 10% by weight of units derived from monomers containing acid groups, and 50% to 98.9% by weight of units derived from (meth)acrylates having 1 to 6 carbon atoms in the alkyl radical, based on the weight of the (meth)acrylate segment.

39 Claims, No Drawings

AQUEOUS DISPERSIONS INCLUDING AT LEAST ONE ALKYD RESIN AND AT LEAST ONE ADDITION POLYMER HAVING AT LEAST ONE (METH)ACRYLAT-SEGMENT

The present invention relates to aqueous dispersions which feature at least one alkyd resin and at least one addition polymer having at least one (meth)acrylate segment. The present invention further relates to processes for preparing these dispersions.

Coating materials, more particularly paints and varnishes, have for a long time been prepared synthetically. Many of these coating materials are based on what are called alkyd resins, which in general are prepared using polybasic acids, alcohols and fatty acids and/or fatty acid derivatives. One particular group of these alkyd resins form crosslinked films on exposure to oxygen, the crosslinking taking place by oxidation with involvement of unsaturated groups. Many of these alkyd resins comprise organic solvents or dispersion media to allow the resins to be applied in a thin film to coating elements. The use of these solvents ought, however, to be abandoned on grounds of environmental protection and of occupational safety. Corresponding resins have therefore been developed based on aqueous dispersions, but their stability on storage is limited. Furthermore, the properties of many alkyd resins are less than optimum. For instance, the water absorption is often too high. For many applications, furthermore, the solvent resistance or the hardness is too low.

Attempts have been undertaken, accordingly, to replace the conventional, alkyd-based coating materials outlined above. A coating composition based on solution polymers based on vinyl monomers, for example, is described in DE-A-101 06 561. That composition, however, includes a high fraction of organic solvents.

Also known, moreover, are aqueous dispersions based on (meth)acrylate polymers. For example, the publication DE-A-41 05 134 describes aqueous dispersions which can be used as binders in coating materials. The preparation of those binders, however, takes place over several stages, in which first a solution polymer is produced which, following neutralization, is used in an emulsion polymerization.

Furthermore, DE-A-25 13 516 describes aqueous dispersions comprising polymers based on (meth)acrylates, where some of the (meth)acrylates contain unsaturated alcohol residues. A particular disadvantage of the dispersions described is their costly and inconvenient preparation, the polymers being obtained on the basis of (meth)acrylates by solution polymerization. In that case these polymers have a high fraction of acid groups, in the range from 5% to 20% by weight, based on the solution polymer.

The publication DE-A-26 38 544 describes oxidatively drying aqueous dispersions which comprise emulsion polymers based on (meth)acrylates, with some of the (meth)acrylates used having unsaturated alcohol residues. However, chain transfer agents have been used to prepare the emulsion polymers, and so the solubility of the emulsion polymer is high.

Furthermore, aqueous dispersions comprising oxidatively drying polymers are set out in F.-B. Chen, G. Bufkin, "Crosslinkable Emulsion Polymers by Autooxidation II", Journal of Applied Polymer Science, Vol. 30, 4551-4570 (1985). The polymers contain 2% to 8% by weight of units derived from (meth)acrylates having unsaturated, long-chain alcohol residues. These polymers, however, do contain any units obtained by polymerization of monomers containing acid groups. For many applications the keeping properties of these dispersions and also the hardness of the coatings are inadequate.

Moreover, the publications U.S. Pat. No. 5,750,751, EP-A-1 044 993 and WO 2006/013061 describe coating materials comprising vinyl-monomer-based polymers which are able to crosslink at room temperature. The polymers can be obtained both by solution polymerization and by emulsion polymerization. The monomer mixtures for polymerization may comprise, among others, (meth)acrylates whose alcohol residues have been modified with unsaturated fatty acids. A disadvantage of the above-described coating materials that comprise polymers based on (meth)acrylates is their high price. Additionally, coatings obtained from the above-described coating materials frequently have a low hardness. There are no references in these documents to the use of these polymers in alkyd resins.

The prior art, furthermore, has also disclosed dispersions which, as well as polymers based on (meth)acrylates, can also comprise alkyd resins. The document WO 98/22545, for example, describes polymers with units derived from (meth)acrylates having unsaturated alcohol residues. These polymers can be used together with alkyd resins. However, solvents are used in order to prepare coating materials from the polymers described. Aqueous dispersions are not described in WO 98/22545. Accordingly, these compositions are hampered by the disadvantages described above.

Furthermore, the Japanese publication JP 59011376 describes emulsion polymers based on (meth)acrylates. These polymers may contain a very high level of (meth)acrylates which comprise unsaturated alcohol residues. Although mixtures with further resins are set out, there is no explicit setting-out of compositions which contain an alkyd resin and a polymer having at least one (meth)acrylate segment which comprises 1% to 30% by weight of units derived from (meth)acrylates which in the alkyl radical have at least one double bond and 8 to 40 carbon atoms, 0.1% to 10% by weight of units derived from monomers containing acid groups, and 50% to 98.9% by weight of units derived from (meth)acrylates having 1 to 6 carbon atoms in the alkyl radical, based on the weight of the (meth)acrylate segment. A disadvantage of the compositions set out in JP 59011376 is their low shelf life.

Moreover, U.S. Pat. No. 4,010,126 discloses compositions which comprise an alkyd resin which is modified with (meth)acrylate polymers and which is subsequently used in an emulsion polymerization. The compositions described are prepared over several steps, meaning that the preparation of the resins described is very costly and inconvenient.

Furthermore, the publication EP-A-0 267 562 describes dispersions which comprise modified alkyd resins. The alkyd resins are prepared using, more particularly, copolymers obtained by solution polymerization of (meth)acrylates and unsaturated fatty acids. In this case these fatty acids are incorporated into the copolymer via their double bonds. These resins are prepared over several steps, making use more particularly of large amounts of solvents. Furthermore, large amounts of ethylene glycol monobutyl ether are needed in order to obtain the dispersions. Similar dispersions are likewise described in DE-A-34 32 482, but have the same disadvantages as those set out in EP-A-0 267 562.

In addition, EP-A-1 578 864 discloses aqueous alkyd resins which have been modified with (meth)acrylate polymers. The (meth)acrylate polymers have been prepared using large amounts of unsaturated fatty acids. The complex preparation of these dispersions, however, is a disadvantage. Furthermore, the dispersions described lead to coatings whose hardness is relatively low.

In view of the prior art, then, it is an object of the present invention to provide coating materials and coatings with outstanding properties. More particularly the coating materials ought to have a very low residual monomer content. Additionally, therefore, it was an object of the present invention to provide a dispersion which has a particularly long storage life and shelf life. Furthermore, the intention was that the hardness of the coatings obtainable from coating materials could be varied over a wide range. In accordance with one particular aspect of the present invention, more particularly, it was intended that compositions be provided that lead to very hard, scratch-resistant coatings.

A further intention was that the coatings obtainable from the coating materials have a high solvent resistance. A further object can be seen in the provision of coating materials without volatile organic solvents. The coatings obtainable from the aqueous dispersions ought to have a high weathering stability, more particularly a high UV stability. Furthermore, the films obtainable from the coating materials ought after a short time to feature a low tack. Moreover, the coating materials of the invention ought to be able to be prepared easily and inexpensively.

These objects and also others which, although not explicitly stated, are nevertheless readily inferable or derivable from the circumstances discussed in the introduction are achieved by aqueous dispersions having all of the features of claim 1. Judicious modifications of the dispersions of the invention are protected in dependent claims. With regard to the preparation processes, claim 22 provides a solution to the underlying objects.

The present invention accordingly provides an aqueous dispersion comprising
at least one alkyd resin and
at least one addition polymer having at least one (meth) acrylate segment which comprises 1% to 30% by weight of units derived from (meth)acrylates which in the alkyl radical have at least one double bond and 8 to 40 carbon atoms,
0.1% to 10% by weight of units derived from monomers containing acid groups, and
50% to 98.9% by weight of units derived from (meth)acrylates having 1 to 6 carbon atoms in the alkyl radical, based in each case on the weight of the (meth)acrylate segment.

Through the measures according to the invention it is additionally possible to obtain advantages including the following:

The dispersions of the invention have a very low residual monomer content.

The hardness of the coatings obtainable from dispersions of the invention can be varied over a wide range. Thus it is possible more particularly to obtain very hard, scratch-resistant coatings. The coatings obtainable from the dispersions of the invention exhibit a surprisingly high solvent resistance, which is manifested more particularly in tests with methyl isobutyl ketone (MIBK) or ethanol. For instance, the coatings obtained exhibit an outstanding classification in the context more particularly of experiments in accordance with the DIN 68861-1 furniture test. In this context it is even possible to clean the coatings with non-polar solvents, more particularly wash benzine, without the coating being damaged irreversibly as a result.

The dispersions of the invention preferably contain no volatile organic solvents. Furthermore, dispersions of the invention exhibit a high level of storage stability, a long shelf life and very good storage properties. More particularly virtually no aggregate is formed.

The coatings obtainable from the aqueous dispersions exhibit a high weathering stability, more particularly a high UV stability. The films obtainable from the aqueous dispersions, furthermore, after a short time feature a low tack. Furthermore, the coating materials of the invention exhibit high wet-film stability and an increased open time.

Furthermore, on numerous substrates, the coatings obtainable from the dispersions of the invention exhibit particularly high strength of adhesion, abrasion resistance and durability. Preferred coatings and substrates coated with the coatings of the invention may be exposed in particular to high mechanical loads without the coating cracking.

The dispersions of the invention can be prepared inexpensively on a large scale. The dispersions of the invention are eco-friendly and can be prepared and processed safely and without great cost and complexity. In this respect the dispersions of the invention exhibit a very high shear stability.

The aqueous dispersions of the invention comprise at least one alkyd resin. Alkyd resins have been known for a long time, the term referring generally to resins obtained by condensing polybasic carboxylic acids and polyhydric alcohols, these compounds generally being modified with long-chain alcohols (fatty alcohols), fatty acids or compounds containing fatty acid, fats or oils for example (DIN 55945; 1968). Alkyd resins are set out in, for example, Ullmann's Encyclopaedia of Industrial Chemistry, 5th edition on CD-ROM. As well as these conventional alkyd resins it is also possible to use resins which have similar properties. These resins likewise feature a high level of groups derived from the long-chain alcohols (fatty alcohols), fatty acids and compounds containing fatty acid, fats or oils for example, that were set out above. These derivatives, however, do not necessarily contain polybasic carboxylic acids, but may instead be obtained, for example, by reacting polyols with isocyanates. The alkyd resins that can be used can be preferably diluted or mixed with water.

Preferred polybasic carboxylic acids for preparing the alkyd resins whose use is preferred in the dispersion of the invention include dicarboxylic and tricarboxylic acids, such as phthalic acid, isophthalic acid, 5-(sodium sulpho) isophthalic acid, terephthalic acid, trimellitic acid, 1,4-cyclohexanedicarboxylic acid, butanedioic acid, maleic acid, fumaric acid, sebacic acid, adipic acid and azelaic acid, for example. These acids can also be used as anhydrides for the preparation. Particular preference is given to using aromatic dicarboxylic acids to prepare the alkyd resins. The fraction of polybasic carboxylic acids is preferably in the range from 2% to 50%, more preferably 5% to 40%, by weight, based on the weight of the reactants used in the reaction mixture for the preparation of the resin.

Also used for preparing the alkyd resins are polyhydric alcohols. These alcohols include, among others, trimethylolpropane, pentaerythritol, dipentaerythritol, trimethylolethane, neopentyl glycol, ethylene glycol, 1,3-butanediol, 1,4-butanediol, 1,6-hexanediol, 1,4-cyclohexyldimethanol, diethylene glycol, triethylene glycol, polyethylene glycol, polytetrahydrofuran, polycaprolactonediol, polycaprolactonetriol, trimethylol monoallyl ether, trimethylol diallyl ether, pentaerythritol triallyl ether, pentaerythritol diallyl ether, pentaerythritol monoallyl ether, 2-ethyl-2-(hydroxymethyl)-1,3-propanediol, 2-methyl-1,3-propanediol. 2,2,4-trimethylpentanediol, 2,2,4-trimethyl-1,3-pentanediol, 2,2'-bis (4-hydroxycyclohexy)propane (hydrogenated bisphenol A), propylene glycol, dipropylene glycol, polypropylene glycol, glycerol and sorbitol. Of these, more particular preference is given to trimethylolethane, trimethylolpropane, pentaerythritol and sorbitol. In accordance with one particular aspect, more particular preference is given to alcohols having three or more hydroxy groups. The fraction of polyhydric alcohols is preferably in the range from 2% to 50%, more preferably 5% to 40, by weight, based on the weight of the reactants used in the reaction mixture for the preparation of the resin.

Furthermore it is possible more particularly to use fatty acids for preparing the alkyd resins set out above. In this context it is possible more particularly to use saturated and unsaturated fatty acids, more particular preference being given to mixtures which comprise unsaturated fatty acids. Preferred fatty acids have 6 to 30, more preferably 10 to 26 and very preferably 12 to 22 carbon atoms. The fraction of fatty acids is preferably in the range from 2% to 90%, more preferably 10% to 70%, by weight, based on the weight of the reactants used in the reaction mixture for the preparation of the resin.

The suitable saturated fatty acids include, among others, caprylic acid, capric acid, lauric acid, myristic acid, palmitic acid, margaric acid, arachidic acid, behenic acid, lignoceric acid, cerotinic acid, palmitoleic acid and stearic acid.

The preferred unsaturated fatty acids include, among others, undecylenic acid, palmitoleic acid, oleic acid, elaidic acid, vaccenic acid, icosenic acid, cetoleic acid, erucic acid, nervonic acid, linoleic acid, linolenic acid, arachidonic acid, timnodonic acid, clupanodonic acid and/or cervonic acid.

Furthermore, the fatty acids set out above may also be used in the form of their esters, such as in the form of triglycerides, for example.

Furthermore, the alkyd resins set out above may have further components. These include, for example, monobasic carboxylic acids, monohydric alcohols, or compounds which lead to emulsifying groups in the resins, such as polyethylene oxides, for example. The alkyd resins, furthermore, may contain hydroxycarboxylic acids, such as 2-, 3- and 4-hydroxybenzoic acid, rizinoleic acid, dihydroxypropionic acid, dihydroxysuccinic acid, dihydroxybenzoic acid, 2,2-dimethylolacetic acid, 2,2-dimethylolpropionic acid, 2,2-dimethylolbutyric acid and 2,2-dimethylolpentanoic acid, for example.

Additionally it is also possible to use modified alkyd resins which have been modified with resins, more particularly rosin, with styrene polymers, with acrylic polymers, with epoxides, with urethanes, with polyamides and/or with silicones. These modifications are set out in places which include the patent literature set out above, and in Ullmann's Encyclopaedia of Industrial Chemistry, 5th edition on CD-ROM. Through these embodiments it is possible to alter, more particularly, the initial drying, adhesive strength, weathering stability, storage properties, chemical resistances, through-curing, the stability of the wet film, and the abrasion resistance.

By way of example it is possible with preference to use alkyd resins which have been modified with polymers obtainable by free-radical addition polymerization. Resins of this kind are known from sources including the publications U.S. Pat. No. 5,538,760, U.S. Pat. No. 6,369,135 and DE-A-199 57 161.

According to the publications U.S. Pat. No. 5,538,760 and U.S. Pat. No. 6,369,135, one of the ways in which modified alkyd resins can be obtained is to polymerize a monomer mixture in the presence of an alkyd resin. The weight ratio of monomer mixture to alkyd resin in this case is preferably in the range from 100:1 to 1:4, more preferably 5:1 to 1:1.

Particularly judicious resins include the acrylate-modified alkyd resins described in DE-A-199 57 161. These alkyd resins, in addition to an alkyd core, have groups which are obtained by polymerizing (meth)acrylates.

These acrylate-modified alkyd resins are preparable by first, in the presence of at least one water-miscible diol,
(1) dispersing at least one alkyd resin containing, based on its total amount, 0.1% to 10% by weight of pendent and/or terminal allyloxy groups in water to give the dispersion 1,
(2) graft-copolymerizing a mixture of methacrylic acid and at least one further, carboxyl-free olefinically unsaturated monomer in the dispersion 1, to give the dispersion 2, and
(3) once or n times
(3.1) graft-copolymerizing at least one acid-group-free, olefinically unsaturated monomer and/or
(3.2) graft-copolymerizing at least one mixture of a least one acid-group-containing, olefinically unsaturated monomer and at least one acid-group-free, olefinically unsaturated monomer in the dispersion 2 or 2 to n−1 that results from the respective preceding process step (2) or (2) to (n−1), with the proviso that, in process step (3) or its repetitions (3) to (n), acid groups are incorporated in an amount totaling not more than 90 mol % of the amount of acid groups incorporated in process step (2).

The pendent and/or terminal allyloxy groups set out above may be present in the alkyd resin in an amount, based in each case on the alkyd resin, of 0.1% to 10%, preferably 0.2% to 9%, more preferably 0.3% to 8%, with particular preference 0.4% to 7%, with very particular preference 0.5% to 6% and more particularly 0.6% to 5% by weight. The oxygen atom of the allyloxy group may be part of a urethane group, an ester group or an ether group that joins the allyl radical to the main chain of the alkyd resin.

Examples of suitable compounds for introducing pendent and/or terminal allyloxy groups are allyl alcohol, 2-hydroxyethyl allyl ether, 3-hydroxypropyl allyl ether, trimethylolpropane monoallyl or diallyl ether, glycerol monoallyl or diallyl ether, pentaerythritol monoallyl, diallyl or triallyl ether, mannitol monoallyl, diallyl, triallyl or tetraallyl ether, allyl esters of dihydroxypropionic, dihydroxysuccinic, dihydroxybenzoic, 2,2-dimethylolacetic, 2,2-dimethylolpropionic, 2,2-dimethylolbutyric or 2,2-dimethylolpentanoic acid, or allylurethane; of these, trimethylolpropane monoallyl ether is of advantage. For the modification of acrylates it is possible to graft-copolymerize dispersion 1 in one stage (2) with methacrylic acid and at least one further olefinically unsaturated monomer. Apart from their olefinically unsaturated double bonds, the further olefinically unsaturated monomers may additionally contain reactive functional groups with the exception of carboxyl groups, examples of the reactive functional groups being isocyanate-reactive, carbamate-reactive, N-methylol- or N-methylol ether-reactive or alkoxycarbonylamino-reactive groups. In this context it is essential that, under the given reaction conditions and the subsequent storage of the dispersions of the invention, these reactive functional groups do not enter into any reactions with the carboxyl groups of the methacrylic acid or with any other reactive functional groups present. One example of reactive functional groups that meet these requirements is the hydroxyl group. These monomers are known per se, examples being set out in DE 199 57 161. They include, more particularly, hydroxyalkyl esters of acrylic acid, of methacrylic acid or of another alpha,beta-olefinically unsaturated carboxylic acid, esters of acrylic acid, esters of methacrylic acid, of crotonic acid or of ethacrylic acid, having up to 20 carbon atoms in the alkyl radical.

Further preferred are alkyd resins obtainable in accordance with publication U.S. Pat. No. 5,096,959. These alkyd resins are modified with cycloaliphatic polycarboxylic acid, with cyclohexanedicarboxylic acids and cyclopentanedicarboxylic acids being suitable more particularly for the modification.

It is possible, furthermore, to use alkyd resins which have been modified with polyethylene glycol. A large number of patent specifications describe the preparation of water-emulsifiable alkyd resins through modification with polyethylene glycol (PEG). In the majority of processes, about 10% to 30% of PEG are incorporated by transesterification or esterification directly into the alkyd resin (see, among others, the U.S. Pat. Nos. 2,634,245; 2,853,459; 3,133,032; 3,223,659; 3,379,548; 3,437,615; 3,437,618; 10 3,442,835; 3,457,206; 3,639,315; the German Laid-Open specification 14 95 032; or the British patent specifications 1,038,696 and 1,044,821).

Preferred alkyd resins modified with polyethylene glycol include those known from the publication EP-A-0 029 145. According to that publication it is possible first to react a polyethylene glycol with carboxylic acid containing epoxide groups. The resulting reaction product can then be used in the reaction mixture for preparing the alkyd resin. Preferred polyethylene glycols for modifying the alkyd resins have a number-average molecular weight of, for example, 500 to 5000 g/mol.

Particularly preferred polyethylene glycol-modified alkyd resins may be modified, furthermore, with copolymers which are obtainable by polymerizing methacrylic acid, unsaturated fatty acids, and vinyl and/or vinylidene compounds.

Also judicious are alkyd resins modified with urethane groups. Alkyd resins of this kind are set out in sources including WO 2006/092211 and In accordance with one judicious embodiment it is possible to use the urethane alkyd resins described in EP-A-1 533 342 that contain units derived from unsaturated fatty acids A1, aliphatic or aromatic or aromatic-aliphatic monocarboxylic acids A2 which are free from olefinic double bonds, cycloaliphatic dicarboxylic acids A3 or their anhydrides, at least trihydric, preferably at least tetrahydric, alcohols A4, and aromatic or aliphatic polyfunctional, more particularly difunctional, isocyanates A5. The urethane alkyd resin is prepared preferably in a two-stage reaction, in the first stage of which components A1 to A4 are esterified, the acid number of the product of the first stage being preferably not more than 10 mg/g, with particular preference not more than 5 mg/g. In the second stage, the hydroxyl-containing product from the first stage is reacted with the isocyanate A5, with addition of a small amount (up to 1% of the mass of the product of the first stage, preferably up to 0.5% of its mass) of a tertiary amine, in a reaction which entails molecular enlargement. Preferred urethane alkyd resins have a Staudinger index, measured in chloroform at 23° C., of at least 9 cm$^3$/g, preferably at least 11 cm$^3$/g.

With preference it is possible to use urethane alkyd resins which are obtainable by reacting polyhydric alcohols A', modified fatty acids B', fatty acids C' and polyfunctional isocyanates D'. The modified fatty acids B' can be prepared by reacting unsaturated fatty acids B1' with unsaturated carboxylic acids B2'. These urethane alkyds are known from sources including WO 2006/092211. The modified fatty acid B' preferably has an acid number of at least 80 mg/g. With particular preference the increase in the acid number as a result of the grafting is situated in the range from 80 mg/g to 250 mg/g, and with very particular preference in the range from 100 mg/g to 150 mg/g, the acid number being determinable in accordance with DIN EN ISO 2114. The iodine number of the fatty acids C' used to prepare the urethane alkyd resins is preferably at least 80 g/100 g and more preferably at least 120 g/100 g. For preparing the urethane alkyd resin described in WO 2006/092211, generally speaking, first components A', B' and C' are reacted, the condensate preferably having a hydroxy functionality of at least 1.9, more preferably at least 2. The condensate may additionally contain groups derived from polybasic carboxylic acids, more particularly the dicarboxylic and tricarboxylic acids set out above. This condensate is subsequently reacted with a polyfunctional isocyanate. The preferred polyfunctional isocyanates include tolylene 2,4- and 2,6-diisocyanate and also their technical mixtures, bis(4-isocyanatophenyl)methane, isophorone diisocyanate, bis(4-isocyanatocyclohexyl)methane and 1,6-diisocyanatohexane, and the isocyanurates, allophanates and biurets derived from them.

Besides the conventional alkyd resins set out above and prepared using, generally, polycarboxylic acids, it is also possible to use further resins, as has already been set out above. Such further resins include, more particularly, urethane resins obtainable by reacting polyhydric alcohols with polyfunctional isocyanates. Preferred urethane resins are known, for example, from EP-A-1 129 147. They can be obtained, for example, by reacting amide ester diols with polyols and polyfunctional isocyanates. The amide ester diols for use in accordance with EP-A-1 129 147, can be obtained by reacting vegetable oils with N,N-dialkanolamines.

In accordance with one preferred aspect of the present invention the alkyd resin may have an iodine number according to DIN 53241 of at least 1 g iodine/100 g, preferably of at least 10 g iodine/100 g, more preferably of at least 15 g iodine/100 g. In accordance with one particular aspect of the present invention the iodine number of the alkyd resin may be situated in the range from 2 to 100 g iodine per 100 g alkyd resin, more preferably 15 to 50 g iodine per 100 g alkyd resin. The iodine number may be determined from a dispersion, with the figure referring to the solids content.

Judiciously the alkyd resin may have an acid number in the range from 0.1 to 100 mg KOH/g, preferably 1 to 40 mg KOH/g and with very particular preference in the range from 2 to 10 mg KOH/g. The acid number may be determined in accordance with DIN EN ISO 2114 from a dispersion, the figure referring to the solids content.

The hydroxy number of the alkyd resin may be situated preferably in the range from 0 to 400 mg KOH/g, with particular preference 1 to 200 mg KOH/g and with very particular preference in the range from 3 to 150 mg KOH/g. The hydroxy number may be determined in accordance with ASTM E222 from a dispersion, the figure referring to the solids content.

The preparation of the alkyd resins is very well established and is accomplished by condensing the alcohols and acids set out above, any modification being able to take place both during this condensation and after this condensation. In this context reference is made particularly to the literature set out above.

The aqueous dispersions of the invention further comprise at least one addition polymer having at least one (meth)acrylate segment which comprises 1% to 30% by weight of units derived from (meth)acrylates which in the alkyl radical have at least one double bond and 8 to 40 carbon atoms, 0.1% to 10% by weight of units derived from monomers containing acid groups, and 50% to 98.9% by weight of units derived from (meth)acrylates having 1 to 6 carbon atoms in the alkyl radical, based on the weight of the (meth)acrylate segment.

The term "addition polymer having at least one (meth)acrylate segment" means that the dispersion comprises particles obtained by addition polymerization of monomer mixtures which comprise at least one (meth)acrylate, it being possible for this polymerization to take place in one step or in stages. This addition polymer may contain one or more polymers, which may be separated, for example, by appropriate solvents. The term "segment" denotes the fact that the addition polymer comprises at least one section with repeating (meth)acrylate units. In this context the addition polymer may consist of one segment thus constructed, or may have further segments. The weight fraction of the (meth)acrylate segment, based on the weight of the addition polymer, is preferably at least 10% by weight, more preferably at least 20% by weight. The addition polymer preferably comprises at least 40%, more preferably at least 60% and very preferably at least 90% by weight of (meth)acrylates.

The (meth)acrylate segment of the addition polymer for use in accordance with the invention comprises 1 to 30% by weight, preferably 5% to 25% and more preferably 10% to 20% by weight of units derived from (meth)acrylates which in the alkyl radical have at least one double bond and 8 to 40 carbon atoms, based on the total weight of the (meth)acrylate segment. The addition polymer may be obtained preferably by free-radical addition polymerization. Accordingly the weight fraction of units is a product of the weight fractions of corresponding monomers that are used for preparing the (meth)acrylate segment.

The expression (meth)acrylates encompasses methacrylates and acrylates and also mixtures of both. (Meth)acrylates which in the alkyl radical have at least one double bond and 8 to 40 carbon atoms are esters of (meth)acrylic acid whose alcohol residue has at least one double bond and 8 to 40 carbon atoms. The alkyl radical or alcohol residue may contain preferably 10 to 30 and more preferably 12 to 20 carbon atoms, it being possible for this radical to include heteroatoms, more particularly oxygen, nitrogen or sulphur atoms. The alcohol residue may have one, two, three or more double bonds. The polymerization conditions under which the addition polymer is prepared are preferably selected such as to maximize the fraction of the double bonds of the alcohol residue that are retained during the polymerization. This may be done, for example, by sterically hindering the double bonds present in the alcohol residue.

The iodine number of the (meth)acrylates for use for preparing the polymers and containing in the alkyl radical at least one double bond and 8 to 40 carbon atoms is preferably at least 40, more preferably at least 80 and very preferably at least 140 g iodine/100 g (meth)acrylate.

(Meth)acrylates of this kind conform in general to the formula (I)

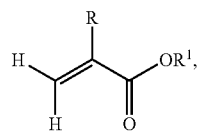

in which the radical R represents hydrogen or methyl and $R^1$ denotes a linear or branched radical having 8 to 40 carbon atoms that contains at least one double bond.

(Meth)acrylates which in the alkyl radical have at least one double bond and 8 to 40 carbon atoms may be obtained, for example, by esterification of (meth)acrylic acid, reaction of (meth)acryloyl halides or transesterification of (meth)acrylates with alcohols which have at least one double bond and 8 to 40 carbon atoms. These reactions are set out in, for example, Ullmann's Encyclopaedia of Industrial Chemistry, 5th edition on CD-ROM, or F.-B. Chen, G. Bufkin, "Crosslinkable Emulsion Polymers by Autooxidation I", Journal of Applied Polymer Science, Vol. 30, 4571-4582 (1985).

The alcohols that are suitable for this purpose include, among others, octenol, nonenol, decenol, undecenol, dodecenol, tridecenol, tetradecenol, pentadecenol, hexadecenol, heptadecenol, octadecenol, nonadecenol, eicosenol, docosenol, octan-dien-ol, nonan-dien-ol, decan-dien-ol, undecan-dien-ol, dodecan-dien-ol, tridecan-dien-ol, tetradecan-dien-ol, pentadecan-dien-ol, hexadecan-dien-ol, heptadecan-dien-ol, octadecan-dien-ol, octadecan-trien-ol, nonadecan-dien-ol, eicosan-dien-ol and/or docosan-dien-ol. These so-called fatty alcohols are in some cases available commercially or can be obtained from fatty acids, that reaction being set out in, for example, F.-B. Chen, G. Bufkin, Journal of Applied Polymer Science, Vol. 30, 4571-4582 (1985).

The preferred (meth)acrylates obtainable by this process include, more particularly, octadecan-dien-yl (meth)acrylate, octadecan-trien-yl (meth)acrylate, hexadecenyl (meth)acrylate, octadecenyl (meth)acrylate and hexadecan-dien-yl (meth)acrylate.

Furthermore, (meth)acrylates which in the alkyl radical have at least one double bond and 8 to 40 carbon atoms can also be obtained by reacting unsaturated fatty acids with (meth)acrylates which have reactive groups in the alcohol residue. The reactive groups include, more particularly, hydroxyl groups and also epoxy groups. Accordingly it is possible to make use, for example, of, hydroxyalkyl (meth) acrylates, such as 3-hydroxypropyl (meth)acrylate, 3,4-dihydroxybutyl (meth)acrylate, 2-hydroxyethyl (meth)acrylate, 2-hydroxypropyl (meth)acrylate, 2,5-dimethyl-1,6-hexanediol (meth)acrylate, 1,10-decanediol (meth)acrylate; or (meth)acrylates containing epoxy groups, an example being glycidyl (meth)acrylate; as reactants for preparing the aforementioned (meth)acrylates.

Suitable fatty acids for reaction of the aforementioned (meth)acrylates are in many cases available commercially and are obtained from natural sources. They include, among others, undecylenic acid, palmitoleic acid, oleic acid, elaidinic acid, vaccenic acid, eicosenoic acid, cetoleic acid, erucic acid, nervonic acid, linoleic acid, linolenic acid, arachidonic acid, timnodonic acid, clupanodonic acid and/or cervonic acid.

The preferred (meth)acrylates which are obtainable by this process include, more particularly, (meth)acryloyloxy-2-hydroxypropyl-linoleic ester, (meth)acryloyloxy-2-hydroxypropyl-linolenic ester and (meth)acryloyloxy-2-hydroxypropyl-oleic ester.

The reaction of the unsaturated fatty acids with (meth) acrylates which have reactive groups in the alcohol residue is known per se and set out for example in DE-A-41 05 134, DE-A-25 13 516, DE-A-26 38 544 and U.S. Pat. No. 5,750, 751.

The (meth)acrylates with at least one double bond that are set out above may be used individually or as a mixture of two or more (meth)acrylates.

Surprising advantages are exhibited more particularly by addition polymers which comprise a high proportion of units derived from (meth)acryloyloxy-2-hydroxypropyl-linoleic ester. By this means it is possible in particular to obtain relatively scratch-resistant, solvent-resistant coatings, the coating materials being particularly easy to process and having a surprisingly high storage stability.

These advantages can be obtained more particularly with addition polymers which comprise at least 20%, preferably at least 40% and very preferably at least 50% by weight of units derived from (meth)acryloyloxy-2-hydroxypropyl-linoleic ester, based on the weight of the units derived from (meth)acrylates which in the alkyl radical have at least one double bond and 8 to 40 carbon atoms. Preferably the addition polymer contains 45% to 80% by weight, more preferably 55% to 70% by weight, of units derived from (meth)acryloyloxy-2-hydroxypropyl-linoleic ester, based on the weight of the units derived from (meth)acrylates which in the alkyl radical have at least one double bond and 8 to 40 carbon atoms.

According to a further aspect of the present invention, addition polymers are preferred which comprise at least 5%, preferably at least 10% and more preferably at least 15% by weight of units derived from (meth)acryloyloxy-2-hydroxypropyl-oleic ester, based on the weight of the units derived from (meth)acrylates which in the alkyl radical have at least one double bond and 8 to 40 carbon atoms. Preferably the addition polymer contains 15% to 45% by weight, more preferably 20% to 35% by weight, of units derived from (meth)acryloyloxy-2-hydroxypropyl-oleic ester, based on the weight of the units derived from (meth)acrylates which in the alkyl radical have at least one double bond and 8 to 40 carbon atoms.

Particular improvements can be achieved, furthermore, if the weight ratio of units derived from (meth)acryloyloxy-2-hydroxypropyl-linoleic ester to units derived from (meth)acryloyloxy-2-hydroxypropyl-oleic ester is greater than or equal to 1, this weight ratio being more preferably in the range from 8:1 to 1:1, with particular preference 5:1 to 3:2.

Furthermore, the (meth)acrylate segment of the addition polymer for use in accordance with the invention comprises 0.1% to 10%, preferably 0.5% to 8% and more preferably 1% to 5% by weight of units derived from monomers containing acid groups, based on the total weight of the (meth)acrylate segment.

Monomers containing acid groups are compounds which can be copolymerized preferably free-radically with the (meth)acrylates set out above. The monomers containing acid groups preferably have 2 to 7 carbon atoms and also one terminal double bond. They include, for example, monomers having a sulphonic acid group, such as vinylsulphonic acid, for example; monomers having a phosphonic acid group, such as vinylphosphonic acid, for example; and unsaturated carboxylic acids, such as methacrylic acid, acrylic acid, fumaric acid and maleic acid, for example. Methacrylic acid and acrylic acid are particularly preferred. The monomers containing acid groups can be used individually or as a mixture of two, three or more monomers containing acid groups.

The (meth)acrylate segment of the addition polymer for use in accordance with the invention further comprises 50% to 98.9%, preferably 60% to 95% and more preferably 70 to 90% by weight of units derived from (meth)acrylates having 1 to 6 carbon atoms in the alkyl radical, based on the total weight of the (meth)acrylate segment.

(Meth)acrylates of this kind conform generally to the formula (II)

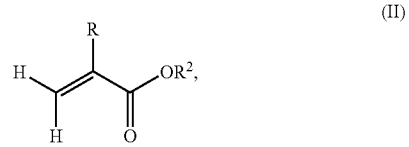

in which the radical R represents hydrogen or methyl and $R^2$ denotes a linear or branched radical having 1 to 6 carbon atoms, preferably 1 to 4 carbon atoms.

These monomers include, more particularly, (meth)acrylates deriving from saturated alcohols, such as methyl (meth)acrylate, ethyl (meth)acrylate, n-propyl (meth)acrylate, isopropyl (meth)acrylate, n-butyl (meth)acrylate, tert-butyl (meth)acrylate and pentyl (meth)acrylate, hexyl (meth)acrylate; cycloalkyl (meth)acrylates, such as cyclopentyl (meth)acrylate, cyclohexyl (meth)acrylate; and
(meth)acrylates deriving from unsaturated alcohols, such as 2-propynyl (meth)acrylate, allyl (meth)acrylate and vinyl (meth)acrylate.

Particular preference is given to using mixtures comprising methacrylates and acrylates. Thus it is possible more particularly to use mixtures of methyl methacrylate and acrylates having 2 to 6 carbons, such as ethyl acrylate, butyl acrylate and hexyl acrylate.

In addition to the units referred to above, the (meth)acrylate segment of the addition polymer for use in accordance with the invention may have units derived from comonomers. These comonomers differ from the units of the addition polymer that have been set out above, but can be copolymerized with the monomers set out above.

They include, for example, (meth)acrylates having at least 7 carbon atoms in the alkyl radical and deriving from saturated alcohols, such as, for example, 2-ethylhexyl (meth)acrylate, heptyl (meth)acrylate, 2-tert-butylheptyl (meth)acrylate, octyl (meth)acrylate, 3-isopropylheptyl (meth)acrylate, nonyl (meth)acrylate, decyl (meth)acrylate, undecyl (meth)acrylate, 5-methylundecyl (meth)acrylate, dodecyl (meth)acrylate, 2-methyldodecyl (meth)acrylate, tridecyl (meth)acrylate, 5-methyltridecyl (meth)acrylate, tetradecyl (meth)acrylate, pentadecyl (meth)acrylate, hexadecyl (meth)acrylate, 2-methylhexadecyl (meth)acrylate, heptadecyl (meth)acrylate, 5-isopropylheptadecyl (meth)acrylate, 4-tert-butyloctadecyl (meth)acrylate, 5-ethyloctadecyl (meth)acrylate, 3-isopropyloctadecyl (meth)acrylate, octadecyl (meth)acrylate, nonadecyl (meth)acrylate, eicosyl (meth)acrylate, cetyleicosyl (meth)acrylate, stearyleicosyl (meth)acrylate, docosyl (meth)acrylate and/or eicosyltetratriacontyl (meth)acrylate; cycloalkyl (meth)acrylates, such as 3-vinylcyclohexyl (meth)acrylate, bornyl (meth)acrylate, cycloalkyl (meth)acrylates, such as 2,4,5-tri-t-butyl-3-vinylcyclohexyl (meth)acrylate, 2,3,4,5-tetra-t-butylcyclohexyl (meth)acrylate; nitriles of (meth)acrylic acid and other nitrogen-containing methacrylates, such as N-(methacryloyloxyethyl)diisobutylketimine, N-(methacryloyloxyethyl)dihexadecylketimine, methacryloylamidoacetonitrile, 2-methacryloyloxyethylmethylcyanamide, cyanomethyl methacrylate; aryl (meth)acrylates, such as benzyl (meth)acrylate or phenyl (meth)acrylate, it being possible for each of the aryl radicals to be unsubstituted or to be substituted up to four times; (meth)acrylates which contain two or more (meth)acrylic groups, glycol di(meth)acrylates, such as ethylene glycol di(meth)acrylate, diethylene glycol di(meth)acrylate, triethylene glycol di(meth)acrylate, tetra- and polyethylene glycol di(meth)acrylate, 1,3-butanediol (meth)acrylate, 1,4-butanediol (meth)acrylate, 1,6-hexanediol di(meth)acrylate, glycerol di(meth)acrylate; dimethacrylates of ethoxylated bisphenol A; (meth)acrylates having three or more double bonds, such as glycerol tri(meth)acrylate, trimethylolpropane tri(meth)acrylate, pentaerythritol tetra(meth)acrylate and dipentaerythritol penta(meth)acrylate; vinyl halides, such as vinyl chloride, vinyl fluoride, vinylidene chloride and vinylidene fluoride, for example; heterocyclic (meth)acrylates, such as 2-(1-imidazolyl)ethyl (meth)acrylate, 2-(4-morpholinyl)ethyl (meth)acrylate and 1-(2-methacryloyloxyethyl)-2-pyrrolidone;
vinyl esters, such as vinyl acetate;

styrene, substituted styrenes having an alkyl substituent in the side chain, such as, for example, α-methylstyrene and β-ethylstyrene, substituted styrenes having an alkyl substituent on the ring, such as vinyltoluene and p-methylstyrene, and halogenated styrenes, such as monochlorostyrenes, dichlorostyrenes, tribromostyrenes and tetrabromostyrenes, for example;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles and hydrogenated vinylthiazoles, vinyloxazoles and hydrogenated vinyloxazoles;

vinyl ethers and isoprenyl ethers;

Maleic acid derivatives such as, for example, maleic anhydride, esters of maleic acid, for example dimethyl maleate, methylmaleic anhydride, maleimide, methylmaleimide; and fumaric acid derivatives, such as dimethyl fumarate.

The fraction of units derived from comonomers can be varied in accordance with the intended use and profile of properties of the polymer. In general this fraction can be situated in the range from 0% to 45%, preferably 2% to 30% and more preferably 3% to 10%, by weight, based on the total weight of the (meth)acrylate segment.

The weathering resistance of the coatings may be improved in particular through a reduction in the proportion of styrene monomers in the coating material and/or in the emulsion polymer, and so particularly UV-stable coatings can be obtained by means of a styrene-free coating material. According to one particular modification of the present invention, the addition polymer having at least one (meth)acrylate segment contains preferably not more than 30%, more preferably not more than 15%, by weight of units derived from styrene, substituted styrenes having an alkyl substituent in the side chain, substituted styrenes having an alkyl substituent on the ring and/or halogenated styrenes, based on the total weight of the (meth)acrylate segment.

Particularly scratch-resistant and solvent-resistant coatings can be obtained more particularly if the addition polymer having at least one (meth)acrylate segment comprises not more than 10% by weight of units derived from (meth)acrylates which are obtainable by reacting saturated fatty acids with at least one (meth)acrylate which has reactive groups in the alcohol residue, based on the total weight of the (meth)acrylate segment. Surprising improvements are exhibited by these coatings more particularly with addition polymers which comprise preferably 0.05% to 5%, more preferably 0.1% to 3%, by weight of units derived from (meth)acrylates which are obtainable by reacting saturated fatty acids with at least one (meth)acrylate which has reactive groups in the alcohol residue, based on the total weight of the (meth)acrylate segment. In this context it is possible with preference to use glycidyl (meth)acrylate as the (meth)acrylate having a reactive group in the alcohol residue. Saturated fatty acids which can be reacted with a (meth)acrylate comprising at least one reactive group in the alcohol residue, preferably glycidyl (meth)acrylate, comprise preferably 10 to 26, more preferably 12 to 22, carbon atoms. The saturated fatty acids having 10 to 26 carbon atoms include more particularly caprylic acid, capric acid, lauric acid, myristic acid, palmitic acid, margaric acid, arachidic acid, behenic acid, lignoceric acid, cerotinic acid, palmitoleic acid and stearic acid.

Preferably the addition polymer having at least one (meth)acrylate segment can have a fraction of 2% to 60%, more preferably 10% to 50% and very preferably 20% to 40%, by weight, based on the weight of the addition polymer having at least one (meth)acrylate segment, which is soluble in tetrahydrofuran (THF) at 20° C. To determine the soluble fraction, a sample of the addition polymer having at least one (meth)acrylate segment that has been dried in the absence of oxygen is stored in 200 times the amount of solvent, based on the weight of the sample, at 20° C. for 4 h. In order to ensure the absence of oxygen, the sample, for example, can be dried under nitrogen or under reduced pressure. Subsequently the solution is separated, by filtration for example, from the insoluble fraction. After the solvent has been evaporated the weight of the residue is determined. For example, a 0.5 g sample of an emulsion polymer dried under reduced pressure can be stored in 150 ml of THF for 4 hours.

In accordance with one preferred modification of the present invention an addition polymer having at least one (meth)acrylate segment may exhibit swelling of at least 1000%, more preferably at least 1400% and very preferably at least 1600% in tetrahydrofuran (THF) at 20° C. The upper limit on the swelling is not critical per se, the swelling preferably being not more than 5000%, more preferably not more than 3000% and very preferably not more than 2500%. To determine the swelling, a sample of the addition polymer having at least one (meth)acrylate segment that has been dried in the absence of oxygen is stored in 200 times the amount of THF at 20° C. for 4 hours. As a result the sample swells. The swollen sample is separated from the supernatant solvent. Subsequently the solvent is removed from the sample. For example, a major fraction of the solvent can be evaporated at room temperature (20° C.). Solvent residues can be removed in a drying oven (140° C.), generally over the course of 1 hour. From the weight of the solvent absorbed by the sample and the weight of the dry sample the swelling is obtained. Furthermore, the difference in the weight of the sample prior to the swelling experiment and the weight of the dried sample after the swelling experiment produces the soluble fraction of the emulsion polymer.

The particle radius of the addition polymer with at least one (meth)acrylate segment may be situated within a wide range. Thus it is possible more particularly to use addition polymers having a particle radius in the range from 10 to 500 nm, preferably 10 to 100 nm, more preferably 20 to 60 nm. Particle radii below 50 nm in particular may be advantageous for film formation and the coating properties.

In accordance with one particular aspect of the present invention the addition polymer having at least one (meth)acrylate segment may have a particle radius of at least 50 nm. The radius of the particles is situated preferably in the range from 60 nm to 500 nm, more preferably 70 to 150 nm and very preferably 75 to 100 nm. The radius of the particles can be determined by means of PCS (Photon Correlation Spectroscopy), the data given relating to the d50 value (50% of the particles are smaller, 50% are larger). This can be done using, for example, a Beckman Coulter N5 Submicron Particle Size Analyzer. Through the use of addition polymers having the aforementioned particle radii it is possible surprisingly to improve the storage properties of the dispersions.

The glass transition temperature of the (meth)acrylate segment is situated preferably in the range from −30° C. to 70° C., more preferably in the range from −20 to 40° C. and very preferably in the range from 0 to 25° C. The glass transition temperature may be influenced via the nature and the fraction of the monomers used to prepare the (meth)acrylate segment. The glass transition temperature, Tg, of the addition polymer may be determined in a known way by means of Differential Scanning Calorimetry (DSC). Moreover, the glass transition temperature Tg may also be calculated approximately in advance by means of the Fox equation. According to Fox T. G., Bull. Am. Physics Soc. 1, 3, page 123 (1956) it is the case that $$\frac{1}{Tg} = \frac{x_1}{Tg_1} + \frac{x_2}{Tg_2} + \ldots + \frac{x_n}{Tg_n}$$

where $x_n$ represents the mass fraction (% by weight/100) of the monomer n and $Tg_n$ identifies the glass transition temperature, in kelvins, of the homopolymer of the monomer n. Further useful information can be found by the skilled person in the Polymer Handbook, 2nd Edition, J. Wiley & Sons, New York (1975), which gives Tg values for the most common homopolymers.

For many applications and properties the architecture of the addition polymer is not critical. The addition polymer may accordingly comprise random copolymers, gradient copolymers, block copolymers and/or graft copolymers. Block copolymers and gradient copolymers can be obtained, for example, by discontinuously altering the monomer composition during chain propagation. In accordance with one preferred aspect of the present invention the addition polymer comprises a random copolymer in which the monomer composition over the polymerization is substantially constant. Since, however, the monomers may have different copolymerization parameters, the precise composition may fluctuate over the polymer chain of the addition polymer.

The addition polymer may constitute a homogeneous polymer which, for example, in an aqueous dispersion forms particles having a consistent composition. In this case the addition polymer may be composed of one or more (meth) acrylate segments which comprise 1% to 30% by weight of units derived from (meth)acrylates which in the alkyl radical have at least one double bond and 8 to 40 carbon atoms, 0.1% to 10% by weight of units derived from monomers containing acid groups, and 50% to 98.9% by weight of units derived from (meth)acrylates having 1 to 6 carbon atoms in the alkyl radical, based on the weight of the (meth)acrylate segment.

In accordance with another embodiment the addition polymer may constitute a core-shell polymer, which may have one, two, three or more shells. In this case the (meth)acrylate segment preferably forms the outermost shell of the core-shell polymer. The shell may be connected to the core or to the inner shells, by covalent bonds. Moreover, the shell may also be polymerized onto the core or onto an inner shell. In this embodiment the polymers of the outermost shell may in many cases be separated and isolated from the core by means of suitable solvents.

The weight ratio of (meth)acrylate segment to core may be situated preferably in the range from 2:1 to 1:6, more preferably 1:1 to 1:3.

The core may be formed preferably of polymers comprising 50% to 100%, preferably 60% to 90%, by weight of units derived from (meth)acrylates. Preference here is given to esters of (meth)acrylic acid whose alcohol residue comprises preferably 1 to 30 carbon atoms, more preferably 1 to 20 carbon atoms and very preferably 1 to 10 carbon atoms. Such (meth)acrylates include, more particularly, (meth)acrylates deriving from saturated alcohols, such as methyl (meth)acrylate, ethyl (meth)acrylate, n-propyl (meth)acrylate, isopropyl (meth)acrylate, n-butyl (meth)acrylate, tert-butyl (meth) acrylate, pentyl (meth)acrylate and hexyl (meth)acrylate.

In accordance with one particular embodiment of the present invention the core can be prepared using a mixture which comprises methacrylates and acrylates. Thus it is possible more particularly to use mixtures of methyl methacrylate and acrylates having 2 to 6 carbons, such as ethyl acrylate, butyl acrylate and hexyl acrylate.

Furthermore, the polymers of the core may comprise the comonomers set out above. In accordance with one preferred modification the core may be crosslinked. This crosslinking may be achieved through the use of monomers having two, three or more free-radically polymerizable double bonds.

The outermost shell of the core-shell polymer may comprise preferably 15% to 28% by weight of units derived from (meth)acrylates which in the alkyl radical have at least one double bond and 8 to 40 carbon atoms.

In accordance with one particular aspect the core may preferably have a glass transition temperature in the range from −30 to 200° C., more preferably in the range from −20 to 150° C. The shell, which is formed preferably by the (meth) acrylate segment of the addition polymer, may preferably have a glass transition temperature in the range from −30° C. to 70° C., more preferably in the range from −20 to 40° C. and very preferably in the range from 0 to 25° C. In accordance with one particular aspect of the present invention the glass transition temperature of the core may be greater than the glass transition temperature of the shell. Judiciously the glass transition temperature of the core may be at least 10° C., preferably at least 20° C., above the glass transition temperature of the shell.

The iodine number of the addition polymer for use in accordance with the invention is preferably in the range from 1 to 150 g iodine per 100 g polymer, more preferably in the range from 2 to 100 g iodine per 100 g polymer and very preferably 5 to 40 g iodine per 100 g polymer, measured in accordance with DIN 53241-1. The iodine number may be measured more particularly on the basis of a dispersion of the invention.

Judiciously the addition polymer having at least one (meth) acrylate segment may have an acid number in the range from 0.1 to 40 mg KOH/g, preferably 1 to 20 mg KOH/g and very preferably in the range from 2 to 10 mg KOH/g. The acid number may be determined in accordance with DIN EN ISO 2114 from a dispersion.

The hydroxyl number of the addition polymer for use in accordance with the invention can be situated preferably in the range from 0 to 200 mg KOH/g, more preferably 1 to 100 mg KOH/g and very preferably in the range from 3 to 50 mg KOH/g. The hydroxyl number may be determined in accordance with ASTM E222 from a dispersion.

The (meth)acrylate-based addition polymer set out above may be prepared in a known way, as for example by solution, bulk or emulsion polymerization, the preparation taking place preferably by way of emulsion polymerization, these processes being set out in sources including Ullmanns's Encyclopaedia of Industrial Chemistry, Fifth Edition.

To prepare the addition polymers by an emulsion polymerization the general approach is to prepare an aqueous phase which as well as water may include typical additives, more particularly emulsifiers and protective colloids for stabilizing the emulsion.

This aqueous phase is then admixed with monomers, and polymerization is carried out in the aqueous phase. When preparing homogeneous polymer particles, it is possible here to add a monomer mixture batchwise or continuously over a time interval.

The dispersing of the monomer phase in the aqueous phase can take place using known agents. These include, more particularly, mechanical methods and also the application of ultrasound.

The monomer mixture for preparing the (meth)acrylate segment of the addition polymers for use in accordance with the invention comprises preferably
1% to 30% by weight of (meth)acrylates which in the alkyl radical have at least one double bond and 8 to 40 carbon atoms,
0.1% to 10% by weight of monomers containing acid groups, and
50% to 98.9% by weight of (meth)acrylates having 1 to 6 carbons in the alkyl radical.

The monomer mixture more preferably contains 1% to 5% by weight of monomers containing acid groups.

In the preparation of homogeneous emulsion polymers it is possible with preference to use a monomer mixture which comprises 10% to 20% by weight of (meth)acrylates which in the alkyl radical have at least one double bond and 8 to 40 carbon atoms.

When preparing core-shell polymers it is possible to change the composition of the monomer mixture in steps, polymerization preferably taking place, before the composition is changed, to a conversion of at least 80% by weight, more preferably at least 95% by weight, based in each case on the total weight of the monomer mixture used. Core-shell polymer here stands for an addition polymer which has been prepared by a two-stage or multistage emulsion polymerization, without the core-shell structure having been shown by means, for example, of electron microscopy. Monitoring of the progress of the polymerization reaction in each step can be effected in a known way, such as by gravimetry or gas chromatography, for example.

The monomer mixture for preparing the core comprises preferably 50% to 100% by weight of (meth)acrylates, particular preference being given to the use of a mixture of acrylates and methacrylates. After the core has been prepared, it is possible to graft or to polymerize onto the core, preferably, a monomer mixture which comprises 15% to 28% by weight of (meth)acrylates which in the alkyl radical have at least one double bond and 8 to 40 carbon atoms.

The emulsion polymerization is conducted preferably at a temperature in the range from 0 to 120° C., more preferably in the range from 30 to 100° C. Polymerization temperatures which have proved to be especially favourable in this context are temperatures in the range from greater than 60 to less than 90° C., judiciously in the range from greater than 70 to less than 85° C., preferably in the range from greater than 75 to less than 85° C.

The polymerization is initiated with the initiators that are customary for emulsion polymerization. Suitable organic initiators are, for example, hydroperoxides such as tert-butyl hydroperoxide or cumene hydroperoxide. Suitable inorganic initiators are hydrogen peroxide and also the alkali metal salts and the ammonium salts of peroxodisulphuric acid, more particularly ammonium, sodium and potassium peroxodisulphate. Suitable redox initiator systems are, for example, combinations of tertiary amines with peroxides or sodium disulphite and alkali metal salts and the ammonium salts of peroxodisulphuric acid, more particularly sodium and potassium peroxodisulphate. Further details can be taken from the technical literature, more particularly H. Rauch-Puntigam, Th. Völker, "Acryl- and Methacrylverbindungen", Springer, Heidelberg, 1967 or Kirk-Othmer, Encyclopaedia of Chemical Technology, Vol. 1, pages 386ff, J. Wiley, New York, 1978.

Particular preference in the context of the present invention is given to the use of organic and/or inorganic initiators.

The stated initiators may be used both individually and in a mixture. They are preferably used in an amount of 0.05% to 3.0% by weight, based on the total weight of the monomers of the respective stage. It is also possible with preference to carry out the polymerization with a mixture of different polymerization initiators having different half-lives, in order to keep the flow of free radicals constant over the course of the polymerization and also at different polymerization temperatures.

Stabilization of the batch is accomplished preferably by means of emulsifiers and/or protective colloids. The dispersion is preferably stabilized by emulsifiers, in order to obtain a low dispersion viscosity. The total amount of emulsifier is preferably 0.1% to 15% by weight, more particularly 1% to 10% by weight and more preferably 2% to 5% by weight, based on the total weight of the monomers used. In accordance with one particular aspect of the present invention it is possible to add a portion of the emulsifiers during the polymerization.

Particularly suitable emulsifiers are anionic or nonionic emulsifiers or mixtures thereof, more particularly
alkyl sulphates, preferably those having 8 to 18 carbon atoms in the alkyl radical, alkyl and alkylaryl ether sulphates having 8 to 18 carbon atoms in the alkyl radical and 1 to 50 ethylene oxide units;
sulphonates, preferably alkylsulphonates having 8 to 18 carbon atoms in the alkyl radical, alkylarylsulphonates having 8 to 18 carbon atoms in the alkyl radical, diesters and monoesters of sulphosuccinic acid with monohydric alcohols or alkylphenols having 4 to 15 carbon atoms in the alkyl radical; where appropriate these alcohols or alkylphenols may also have been ethoxylated with 1 to 40 ethylene oxide units;
phosphoric acid partial esters and their alkali metal and ammonium salts, preferably alkyl and alkylaryl phosphates having 8 to 20 carbon atoms in the alkyl or alkylaryl radical and 1 to 5 ethylene oxide units;
alkyl polyglycol ethers, preferably having 8 to 20 carbon atoms in the alkyl radical and 8 to 40 ethylene oxide units;
alkylaryl polyglycol ethers, preferably having 8 to 20 carbon atoms in the alkyl or alkylaryl radical and 8 to 40 ethylene oxide units;
ethylene oxide/propylene oxide copolymers, preferably block copolymers, favourably having 8 to 40 ethylene and/or propylene oxide units.

The particularly preferred anionic emulsifiers include, more particularly, fatty alcohol ether sulphates, diisooctyl sulphosuccinate, lauryl sulphate, C15-paraffinsulphonate, it being possible to use these compounds generally in the form of the alkali metal salt, more particularly the sodium salt. These compounds may be obtained commercially, more particularly, under the commercial designations Disponil® FES 32, Aerosol® OT 75, Texapon® K1296 and Statexan® K1 from the companies Cognis GmbH, Cytec Industries, Inc. and Bayer AG.

Judicious nonionic emulsifiers include tert-octylphenol ethoxylate with 30 ethylene oxide units and fatty alcohol polyethylene glycol ethers which have preferably 8 to 20 carbon atoms in the alkyl radical and 8 to 40 ethylene oxide units. These emulsifiers are available commercially under the commercial designations Triton® X 305 (Fluka), Tergitol® 15-S-7 (Sigma-Aldrich Co.), Marlipal® 1618/25 (Sasol Germany) and Marlipal® O 13/400 (Sasol Germany).

With preference it is possible to use mixtures of anionic emulsifier and nonionic emulsifier. The weight ratio of anionic emulsifier to nonionic emulsifier can judiciously be in the range from 20:1 to 1:20, preferably 2:1 to 1:10 and more preferably 1:1 to 1:5. Mixtures which have proven to be especially appropriate are those comprising a sulphate, more particularly a fatty alcohol ether sulphate, a lauryl sulphate, or a sulphonate, more particularly a diisooctyl sulphosuccinate or a paraffin sulphonate, as anionic emulsifier, and an alkylphenol ethoxylate or a fatty alcohol polyethylene glycol ether having in each case preferably 8 to 20 carbon atoms in the alkyl radical and 8 to 40 ethylene oxide units, as nonionic emulsifier.

Where appropriate the emulsifiers can also be used in a mixture with protective colloids. Suitable protective colloids include partially hydrolysed polyvinyl acetates, polyvinylpyrrolidones, carboxymethyl-, methyl-, hydroxyethyl and hydroxypropyl-cellulose, starches, proteins, poly(meth)acrylic acid, poly(meth)acrylamide, polyvinylsulphonic acids, melamine-formaldehyde sulphonates, naphthalene-formaldehyde sulphonates, styrene-maleic acid and vinyl ether-maleic acid copolymers. If protective colloids are used they are used preferably in an amount of 0.01 to 1.0% by weight, based on the total amount of the monomers. The protective colloids may be included in the initial charge before the start of the polymerization, or metered in. The initiator may be included in the initial charge or metered in. It is also possible, furthermore, to include a portion of the initiator in the initial charge and to meter in the remainder.

The polymerization is preferably started by heating the batch to the polymerization temperature and metering in the initiator, preferably in aqueous solution. The metered feeds of emulsifier and monomers may be carried out separately or as a mixture. In the case of the metered addition of mixtures of emulsifier and monomer, the approach taken is to premix emulsifier and monomer in a mixer upstream of the polymerization reactor. Preferably the remainders of emulsifier and of monomer which have not been included in the initial charge are metered in separately from one another after the start of the polymerization. With preference it is possible to commence the metered feed 15 to 35 minutes after the start of the polymerization.

Addition polymers having at least one (meth)acrylate segment, and with a high fraction of insoluble polymers, can be obtained in the manner set out above, the reaction parameters for obtaining a high molecular weight being known. Thus it is possible more particularly in this context to omit the use of molecular weight regulators.

One of the ways in which the adjustment of the particle radii of the addition polymer can be influenced is via the fraction of emulsifiers. The higher this fraction, more particularly at the beginning of the polymerization, the smaller the particles obtained.

For preparing the aqueous dispersions of the invention, an aqueous alkyd resin can be mixed with the addition polymer set out above.

The weight fractions of alkyd resin and addition polymer based on (meth)acrylates may be situated within a wide range, which may generally be adapted to the desired profile of properties. Preferably the weight ratio of alkyd resin to (meth)acrylate-based addition polymer is situated in the range from 20:1 to 1:20, more preferably 5:1 to 1:5 and very preferably 3:1 to 1:3, based on the dry weight of the respective components.

The aqueous dispersions obtained by the process of the invention can be used as coating materials. The aqueous dispersions preferably have a solids content in the range from 10% to 70% by weight, more preferably 20% to 60% by weight.

To prepare a dispersion of the invention it is possible with preference to use an addition-polymer dispersion which has a dynamic viscosity within the range from 0.1 to 180 mPas, preferably 1 to 80 mPas, and very preferably 5 to 20 mPas, measured in accordance with DIN EN ISO 2555 at 25° C. (Brookfield).

Besides water and the (meth)acrylate-based addition polymers and alkyd resins set out above, the dispersions of the invention may include additives or further components for adapting the properties of the coating material to specific requirements. These additional substances include, more particularly, drying assistants, known as siccatives, and flow improvers, pigments and dyes.

With particular preference it is possible to add siccatives to the aqueous dispersions. These siccatives include, more particularly, organometallic compounds, examples being metal soaps of transition metals, such as cobalt, manganese, lead and zirconium, for example; alkali metals or alkaline earth metals, such as lithium, potassium and calcium, for example. Examples that may be mentioned include cobalt naphthalate and cobalt acetate. The siccatives can be used individually or as a mixture, in which case particular preference is given more particularly to mixtures which comprise cobalt salts, zirconium salts and lithium salts.

The coating materials of the invention preferably have a minimum film formation temperature of not more than 50° C., with particular preference not more than 35° C. and very particular preference not more than 25° C., a temperature which can be measured in accordance with DIN ISO 2115.

In accordance with one preferred aspect of the present invention it is possible for an aqueous dispersion of the invention to have an iodine number according to DIN 53241 of at least 1 g iodine/100 g, preferably of at least 10 g iodine/100 g, more preferably at least 15 g iodine/100 g. In accordance with one particular aspect of the present invention the iodine number of the aqueous dispersion may be situated in the range from 2 to 100 g iodine per 100 g aqueous dispersion, more preferably 15 to 50 g iodine per 100 g aqueous dispersion. The iodine number may be determined from a dispersion, the figure being based on the solids content.

The aqueous dispersion may judiciously have an acid number in the range from 0.1 to 100 mg KOH/g, preferably 1 to 40 mg KOH/g and very preferably in the range from 2 to 10 mg KOH/g. The acid number may be determined in accordance with DIN EN ISO 2114 from a dispersion, the figure being based on the solids content.

The hydroxyl number of an aqueous dispersion of the invention may be situated preferably in the range from 0 to 400 mg KOH/g, more preferably 1 to 200 mg KOH/g and very preferably in the range from 3 to 150 mg KOH/g. The hydroxyl number can be determined in accordance with ASTM E222 from a dispersion, the figure being based on the solids content.

The aqueous dispersions of the present invention can be used more particularly as coating materials or as additives for them. Such materials include, more particularly, paints and varnishes, impregnating compositions, adhesives and/or primer systems. With particular preference the aqueous dispersions can be employed for producing paints, varnishes or impregnating compositions for applications on wood and/or metal.

The coatings obtainable from the coating materials of the invention exhibit high solvent resistance: more particularly, only small fractions are dissolved from the coating by solvents. Preferred coatings exhibit a high resistance, more particularly, to methyl isobutyl ketone (MIBK). Hence the weight loss after treatment with MIBK amounts preferably to not more than 50% by weight, more preferably not more than 35% by weight. The absorption of MIBK amounts preferably to not more than 300% by weight, with particular preference not more than 250% by weight, based on the weight of the coating employed. These values are measured at a temperature of approximately 25° C. over an exposure time of at least 4 hours, the coating subjected to measurement being a fully dried coating. This drying takes place in the presence of oxygen, air for example, in order to allow crosslinking.

The coatings obtained from the coating materials of the invention display a high mechanical stability. The pendulum hardness is preferably at least 20 s, more preferably at least 25 s, measured in accordance with DIN ISO 1522.

The present invention will be illustrated in greater detail below with reference to an example, without any intention thereby to restrict the invention.

INVENTIVE EXAMPLE 1

First of all, in a 2 l PE beaker, 180 g of butyl acrylate (BA), 156 g of methyl methacrylate (MMA), 60 g of methacryloyloxy-2-hydroxypropyl-linoleic ester, 4 g of methacrylic acid (MAA), 1.2 g of ammonium peroxodisulphate (APS), 12.0 g of Disponil FES 32 (30% form) and 359.18 g of water were emulsified using an Ultra-Turrax at 4000 rpm for 3 minutes. The methacryloyloxy-2-hydroxypropyl-linoleic ester was obtained by reacting linoleic acid with glycidyl methacrylate.

A 2 l glass reactor which had a water bath heating facility and was equipped with a blade stirrer was charged with 230 g of water and 0.3 g of Disponil FES 32 (30% form) and this initial charge was heated to 80° C. and admixed with 0.3 g of ammonium peroxodisulphate (APS) in solution in 10 g of water. 5 minutes after the addition of the APS, the emulsion prepared beforehand was metered in over the course of 240 minutes (interval: 3 minutes' feed, 4 minutes' pause, 237 minutes' feed of remainder).

After the end of the feeds the batch was stirred at 80° C. for 1 hour. Thereafter it was cooled to room temperature and the dispersion was filtered through VA screen fabric of 0.09 mm mesh size.

The emulsion prepared had a solids content of 40±1%, a pH of 2.6, a viscosity of 17 mPas and an $r_{N5}$ value of 75 nm.

117.15 g of the aqueous emulsion prepared before were mixed with 33.7 g of a PU alkyd resin (available commercially from Worlée under the designation Worlée E150W).

The properties of the resulting coating material were investigated by a variety of methods. On dried films, experiments relating to the solvent resistance, water absorption and scratch resistance were carried out for this purpose.

The solvent resistance was determined using methyl isobutyl ketone (MIBK), with a sample being swollen with MIBK at room temperature for 4 hours. Thereafter the sample was taken from the solvent and excess solvent was removed. Subsequently the sample was dried at about 140° C. for 1 hour. The fraction of the sample that was removed by the solvent is calculated from the weight loss. The values set out in Table 1 relate to the weight of the coating following treatment with MIBK, also referred to herein as "true swelling". The values for the swelling in MIBK which relate to the weight of the coating employed are lower.

The water absorption can be determined using a specimen of untreated solid pine (dimensions: 45-50 mm×45-50 mm×17 mm). The specimen was provided with a layer of varnish and placed in water at room temperature, with only the coated surface in contact with the water. The water absorption is calculated from the increase in weight of the specimen.

The scratch resistance was investigated with the pencil hardness test and with the pendulum test. In addition, a rub test was carried out in accordance with ASTM D 4752, using acetone and cleaning benzine. The results obtained are given in Table 1.

INVENTIVE EXAMPLE 2

Example 1 was essentially repeated, but using 117.15 g of an aqueous emulsion obtained with methacryloyloxy-2-hydroxypropyl-oleic ester rather than methacryloyloxy-2-hydroxypropyl-linoleic ester. This emulsion was mixed with 33.7 g of a PU alkyd resin (available commercially from Worlée under the designation Worlée E150W). The results obtained with this coating material are given in Table 1.

INVENTIVE EXAMPLE 3

Example 1 was essentially repeated, but using 117.15 g of an aqueous emulsion obtained with linoyl methacrylate rather than methacryloyloxy-2-hydroxypropyl-linoleic ester. This emulsion was mixed with 33.7 g of a PU alkyd resin (available commercially from Worlée under the designation Worlée E150W). Linoyl methacrylate was obtained by transesterifying linolyl alcohol with methyl methacrylate (cf. F.-B. Chen, G. Bufkin, "Crosslinkable Emulsion Polymers by Autooxidation II", Journal of Applied Polymer Science, Vol. 30, 4551-4570 (1985)). The results obtained with this coating material are given in Table 1.

INVENTIVE EXAMPLE 4

Example 1 was essentially repeated, but mixing 66.29 g of the aqueous dispersion prepared in Example 1 with 57.2 g of a polyurethane alkyd resin (available commercially from Worlée under the designation E150W). On dried films, experiments relating to the solvent resistance, water absorption and scratch resistance were carried out. The results obtained are given in Table 1.

COMPARATIVE EXAMPLE 1

In a further experiment, the alkyd resin used in Example 1 was investigated without the addition of the above-described (meth)acrylate-based addition polymer. On dried films, experiments relating to the solvent resistance, water absorption and scratch resistance were carried out. Additionally, a rub test was carried out with acetone and cleaning benzine. The results obtained are given in Table 1.

COMPARATIVE EXAMPLE 2

First of all, in a 2 l PE beaker, 216 g of butyl acrylate (BA), 180 g of methyl methacrylate (MMA), 4 g of methacrylic acid (MAA), 1.2 g of ammonium peroxodisulphate (APS), 12.0 g of Disponil FES 32 (30% form) and 359.18 g of water were emulsified using an Ultra-Turrax at 4000 rpm for 3 minutes.

A 2 l glass reactor which had a water bath heating facility and was equipped with a blade stirrer was charged with 230 g of water and 0.3 g of Disponil FES 32 (30% form) and this initial charge was heated to 80° C. and admixed with 0.3 g of ammonium peroxodisulphate (APS) in solution in 10 g of water. 5 minutes after the addition of the APS, the emulsion prepared beforehand was metered in over the course of 240 minutes (interval: 3 minutes' feed, 4 minutes' pause, 237 minutes' feed of remainder).

After the end of the feeds the batch was stirred at 80° C. for 1 hour. Thereafter it was cooled to room temperature and the dispersion was filtered through VA screen fabric of 0.09 mm mesh size.

On dried films, experiments relating to the solvent resistance, water absorption and scratch resistance were carried out.

TABLE 1

Results of the investigations of properties

|  | Inventive Example 1 | Inventive Example 2 | Inventive Example 3 | Inventive Example 4 | Comparative Example 1 | Comparative Example 2 |
|---|---|---|---|---|---|---|
| Pendulum hardness [s] | 53.2 | 25.2 | 41.8 | 25.2 | 13.3 | 7 |
| Pencil hardness | 3H | 3H | 2H | 3H | <6B | — |
| True swelling in MIBK [%] | 306 | 438 | 522 | 374 | 391 | dissolved |
| Weight loss as a result of MIBK [%] | 27.6 | 33.8 | 37.9 | 30.1 | 47.7 | dissolved |
| Water absorption 6 h (blank value 38.7%) | 9.9% | 14.6 | 13.5 | 12.1 | 14.0% |  |
| Rub test with acetone [number of rubs to detach the film] | 25 |  |  |  | 27 |  |
| Rub test with cleaning benzine [number of rubs to detach the film] | >50 |  |  |  | 21 |  |

INVENTIVE EXAMPLE 5

Example 1 was essentially repeated, but mixing 117.15 g of the aqueous dispersion prepared in Example 1 with 33.7 g of a urethane-modified, cosolvent-free, short-oil alkyd emulsion. On dried films, experiments relating to the solvent resistance, water absorption and scratch resistance were carried out.

In this case, additionally, a furniture test was carried out in accordance with DIN 68861-1.

The results obtained are given in Table 2.

INVENTIVE EXAMPLE 6

Example 5 was essentially repeated, but mixing 66.29 g of the aqueous dispersion prepared in Example 1 with 57.2 g of a urethane-modified, cosolvent-free, short-oil alkyd emulsion. On dried films, experiments relating to the solvent resistance, water absorption and scratch resistance were carried out. The results obtained are given in Table 2.

INVENTIVE EXAMPLE 7

Example 5 was essentially repeated, but mixing 33.7 g of the aqueous dispersion prepared in Example 1 with 117.15 g of a urethane-modified, cosolvent-free, short-oil alkyd emulsion. On dried films, experiments relating to the solvent resistance, water absorption and scratch resistance were carried out. The results obtained are given in Table 2.

COMPARATIVE EXAMPLE 3

In a further experiment, the alkyd resin used in Example 5 was investigated without the addition of the above-described (meth)acrylate-based addition polymer. On dried films, experiments relating to the solvent resistance, water absorption and scratch resistance were carried out. The results obtained are given in Table 2.

TABLE 2

Results of the investigations of properties

|  | Inventive Example 5 | Inventive Example 6 | Inventive Example 7 | Comparative Example 3 |
|---|---|---|---|---|
| Pendulum hardness [s] | 14.2 | 15.1 | 18.2 | 12.6 |
| True swelling in MIBK [%] | 368 | 403 | 241 | 1024 |
| True swelling in ethanol [%] | 123 | 154 | 170 | 281 |
| Furniture test DIN 68861-1/48% EtOH | 5 | 5 | 5 | 3 |
| Furniture test DIN 68861-1/15% HOAc | 5 | 5 | 5 | 3 |

The invention claimed is:

1. Aqueous dispersion comprising at least one alkyd resin and at least one addition polymer having at least one (meth) acrylate segment which comprises
    1% to 30% by weight of units derived from (meth)acrylate comprising an alkyl radical with at least one double bond and 8 to 40 carbon atoms,
    0.1% to 10% by weight of units derived from a monomer containing acid groups, and
    50% to 98.9% by weight of units derived from (meth) acrylate having 1 to 6 carbon atoms in the alkyl radical, based in each case on the weight of the (meth)acrylate segment.

2. The aqueous dispersion according to claim 1, wherein the alkyd resin is obtained by a process comprising reacting a polyhydric alcohol with a polyfunctional isocyanate.

3. The aqueous dispersion according to claim 1, wherein the alkyd resin comprises units derived from aromatic dicarboxylic acid.

4. The aqueous dispersion according to claim 1, wherein the alkyd resin comprises units derived from alcohol having three or more hydroxy groups.

5. The aqueous dispersion according to claim 1, wherein the alkyd resin comprises units derived from fatty acid having 6 to 30 carbon atoms.

6. The aqueous dispersion according to claim 5, wherein the alkyd resin comprises units derived from unsaturated fatty acid having 6 to 30 carbon atoms.

7. The aqueous dispersion according to claim 1, wherein the alkyd resin comprises an iodine number of at least 10 g iodine/100 g.

8. The aqueous dispersion according to claim 1, wherein the alkyd resin comprises an acid number in the range from 0.1 to 100 mg KOH per g alkyd resin.

9. The aqueous dispersion according to claim 1, wherein the alkyd resin comprises a hydroxy number in the range from 1 to 200 mg KOH per g alkyd resin.

10. The aqueous dispersion according to claim 1, wherein the alkyd resin is a urethane alkyd resin obtainable by a process comprising reacting a polyhydric alcohol A', a modified fatty acid B', a fatty acid C' and a polyfunctional isocyanate D'.

11. The aqueous dispersion according to claim 1, wherein the addition polymer comprises at least one (meth)acrylate segment having a particle radius of at least 50 nm.

12. The aqueous dispersion according to claim 1, wherein the (meth)acrylate comprising the alkyl radical having at least one double bond and 8 to 40 carbon atoms is obtained by a process comprising reacting at least one unsaturated fatty acid with at least one (meth)acrylate which has at least one reactive group in the alcohol residue.

13. The aqueous dispersion according to claim 12, wherein the (meth)acrylate having at least one reactive group in the alcohol residue is a hydroxyalkyl (meth)acrylate or a (meth)acrylate having at least one epoxy group.

14. The aqueous dispersion according to claim 12, wherein the (meth)acrylate having an alkyl radical have at least one double bond and 8 to 40 carbon atoms is obtained by a process comprising reacting unsaturated fatty acid with glycidyl (meth)acrylate.

15. The aqueous dispersion according to claim 1, wherein the addition polymer having at least one (meth)acrylate segment comprises a unit derived from (meth)acryloyloxy-2-hydroxypropyl-linoleic ester, (meth)acryloyloxy-2-hydroxypropyl-linolenic ester or (meth)acryloyloxy-2-hydroxypropyl-oleic ester, or mixtures thereof.

16. The aqueous dispersion according to claim 15, wherein the weight ratio of units derived from (meth)acryloyloxy-2-hydroxypropyl-linoleic ester to units derived from (meth)acryloyloxy-2-hydroxypropyl-oleic ester is greater than or equal to 1.

17. The aqueous dispersion according to claim 15, wherein the addition polymer having at least one (meth)acrylate segment comprises at least 40% by weight of units derived from (meth)acryloyloxy-2-hydroxypropyl-linoleic ester, based on the weight of the units derived from (meth)acrylates which in the alkyl radical have at least one double bond and 8 to 40 carbon atoms.

18. The aqueous dispersion according to claim 17, wherein the addition polymer having at least one (meth)acrylate segment comprises 45% to 80% by weight of units derived from (meth)acryloyloxy-2-hydroxypropyl-linoleic ester, based on the weight of the units derived from (meth)acrylate which in the alkyl radical have at least one double bond and 8 to 40 carbon atoms.

19. The aqueous dispersion according to claim 15, wherein the addition polymer having at least one (meth)acrylate segment comprises at least 10% by weight of units derived from (meth)acryloyloxy-2-hydroxypropyl-oleic ester, based on the weight of the units derived from (meth)acrylate which in the alkyl radical have at least one double bond and 8 to 40 carbon atoms.

20. The aqueous dispersion according to claim 19, wherein the addition polymer having at least one (meth)acrylate segment comprises 15% to 45% by weight of units derived from (meth)acryloyloxy-2-hydroxypropyl-oleic ester, based on the weight of the units derived from (meth)acrylate which in the alkyl radical have at least one double bond and 8 to 40 carbon atoms.

21. The aqueous dispersion according to claim 1, wherein the addition polymer having at least one (meth)acrylate segment comprises 2% to 30% by weight of units derived from a comonomer, based on the weight of the (meth)acrylate segment.

22. The aqueous dispersion according to claim 1, wherein the addition polymer having at least one (meth)acrylate segment comprises not more than 30% by weight of units derived from styrene, substituted styrene having an alkyl substituent in the side chain, substituted styrene having an alkyl substituent on the ring or halogenated styrene, or mixtures thereof, based on the weight of the (meth)acrylate segment.

23. The aqueous dispersion according to claim 1, wherein the addition polymer having at least one (meth)acrylate segment comprises not more than 10% by weight of units derived from (meth)acrylate which is obtained by a process comprising reacting saturated fatty acids with at least one (meth)acrylate which has reactive groups in the alcohol residue, based on the weight of the (meth)acrylate segment.

24. The aqueous dispersion according to claim 23, wherein the addition polymer having at least one (meth)acrylate segment comprises 0.1% to 3% by weight of units derived from (meth)acrylate which is obtained by a process comprising reacting a saturated fatty acid with at least one (meth)acrylate which has reactive groups in the alcohol residue, based on the weight of the (meth)acrylate segment.

25. The aqueous dispersion according to claim 23, wherein the saturated fatty acids have 10 to 26 carbon atoms.

26. The aqueous dispersion according to claim 23, wherein the (meth)acrylate is obtained by a process comprising reacting a saturated fatty acid with glycidyl (meth)acrylate.

27. The aqueous dispersion according to claim 1, wherein 2% to 60% by weight of the addition polymer having at least one (meth)acrylate segment are soluble in tetrahydrofuran (THF) at 20° C.

28. The aqueous dispersion according to claim 1, wherein the addition polymer having at least one (meth)acrylate segment has a core-shell structure.

29. The aqueous dispersion according to claim 28, wherein the core comprises 50% to 100% by weight of units derived from (meth)acrylate.

30. The aqueous dispersion according to claim 28, wherein the core comprises units derived from acrylate and units derived from (meth)acrylate.

31. The aqueous dispersion according to claim 28, wherein the shell comprises 15% to 28% by weight of units derived from (meth)acrylate which in the alkyl radical have at least one double bond and 8 to 40 carbon atoms.

32. The aqueous dispersion according to claim 1, wherein the addition polymer having at least one (meth)acrylate segment comprises 10% to 20% by weight of units derived from (meth)acrylate comprising an alkyl radical having at least one double bond and 8 to 40 carbon atoms.

33. The aqueous dispersion according to claim 1, wherein the addition polymer having at least one (meth)acrylate segment has an iodine number in the range of from 5 to 40 g/100 g polymer.

34. The aqueous dispersion according to claim 1, wherein the aqueous dispersion has an iodine number in the range of from 2 to 100 g/100 g dispersion, based on the solids content.

35. The aqueous dispersion according to claim 1, wherein the aqueous dispersion has an acid number in the range from 0.1 to 100 g/100 g dispersion, based on the solids content.

36. The aqueous dispersion according to claim 1, wherein the weight ratio of alkyd resin to addition polymer having at least one (meth)acrylate segment is in the range from 20:1 to 1:20, based on the dried weight of the respective components.

37. A process for preparing aqueous dispersions according to claim 1, comprising preparing an aqueous dispersion of an addition polymer having at least one (meth)acrylate segment, and mixing said aqueous dispersion with an alkyd resin.

38. The process according to claim 37, wherein the addition polymer having at least one (meth)acrylate segment is an emulsion polymer.

39. The process according to claim 37, wherein the addition polymer is mixed in the form of an aqueous addition-polymer dispersion with the alkyd resin, the aqueous addition-polymer dispersion having a dynamic viscosity in the range from 1 to 80 mPas.

* * * * *